R. SIMPSON.
GRATES FOR STOVES, FURNACES, &c.

No. 190,091.   Patented April 24, 1877.

Witnesses,
W. J. Cambridge
J. E. Cambridge

Inventor,
Robert Simpson
per Fetschemacher & Stearns
Attys.

UNITED STATES PATENT OFFICE.

ROBERT SIMPSON, OF BOSTON, MASSACHUSETTS, ASSIGNOR TO THE HIGHLAND FOUNDRY COMPANY, OF SAME PLACE.

IMPROVEMENT IN GRATES FOR STOVES, FURNACES, &c.

Specification forming part of Letters Patent No. 190,091, dated April 24, 1877; application filed February 19, 1877.

*To all whom it may concern:*

Be it known that I, ROBERT SIMPSON, of Boston, in the county of Suffolk and State of Massachusetts, have invented certain Improvements in Grates for Stoves and Furnaces, &c., of which the following is a full, clear, and exact description, reference being had to the accompanying drawings, making part of this specification, in which—

Figure 1:
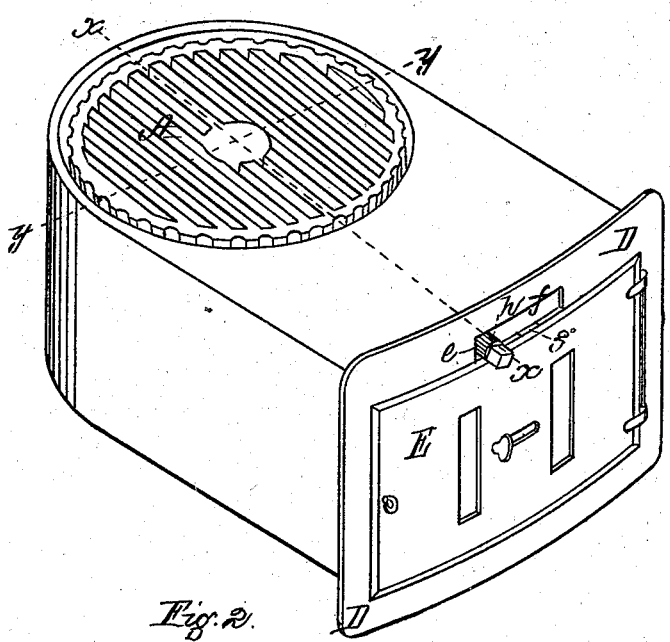
Figure 2:
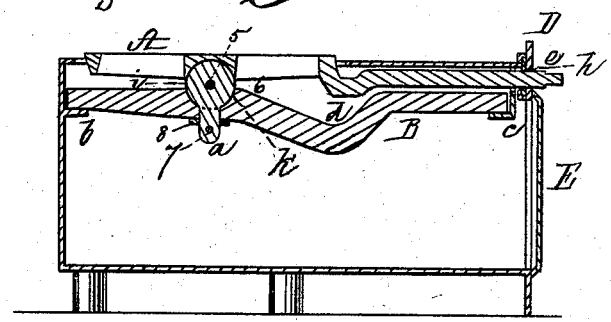
Figure 3:
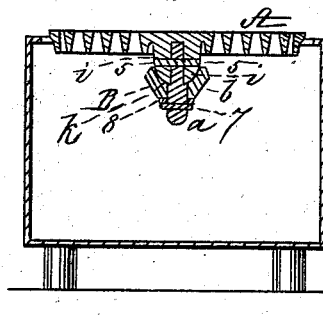

Figure 1 is a perspective view of my improved grate applied to a hot-air furnace; Fig. 2 is a longitudinal vertical section through the same on the line $x\ x$ of Fig. 1. Fig. 3 is a transverse vertical section through the same on the line $y\ y$ of Fig. 1.

My invention has for its object to afford a convenient means of tipping a grate down in front, in order to allow of the easy removal of clinkers, slate, &c.; and my invention consists in the general construction and arrangement of parts, as will be hereinafter fully described.

To enable others skilled in the art to understand and use my invention, I will proceed to describe the manner in which I have carried it out.

In the said drawings, A represents a circular grate from the center of the under side of which project two lugs, between which is pivoted at 5 the enlarged upper portion of a pin, $a$, which fits snugly within and passes down through a hole formed in the enlarged portion 6 of the supporting bar or axle B, which extends lengthwise through the ash-pit C, the extremities of the bar B being rounded off to form journals which rock in fixed bearings $b$ $c$ to allow the grate to be dumped.

The pin $a$ is held securely in place and prevented from becoming detached from the bar B by a small transverse pin, 7, a washer, 8, being interposed between the pin 7 and the under side of the bar B.

A portion of the bar B in front of the center of the grate is crooked or curved in such manner as to form a depression, $d$, which allows the grate to be tipped down in front, on its jointed pin $a$, by lowering the handle $e$ to admit of the ready removal of clinkers, &c., without dumping the grate.

The handle $e$ of the grate projects through a slot, $f$, in the front of the frame D, an opening, $g$, being formed therein, which, when the opening $h$ in the follower for the passage of handle $e$ is brought in line therewith, and the ash-pit door E is open, allows the handle to be dropped as desired. The two lugs on the under side of the grate, which between the pin $a$ is pivoted, are rounded on their outer surfaces so as to form, with the upper portion of the pin $a$, a semi-spherical projection, $i$, which fits snugly into a cup-shaped socket or recess, $k$, formed in the enlarged portion 6 of the supporting-bar B, the ball-and-socket joint thus formed affording a firm bearing for the grate and facilitating its horizontal or lateral movement.

What I claim as my invention, and desire to secure by Letters Patent, is—

1. The combination of the grate A, provided with the central lugs, bar B having hole with enlarged portion 6, and pin $a$ having the enlarged upper portion pivoted to the grate, and pin 7 for securing pin $a$ to the bar B, the several parts constructed and arranged to operate in the manner herein shown and described.

2. A grate pivoted at its center, in combination with a supporting bar or axle extending lengthwise through the ash-pit, and having a crooked portion or depression, $d$, to allow of the grate being tipped down in front, substantially as and for the purpose specified.

Witness my hand this 13th day of February, A. D. 1877.

ROBERT SIMPSON.

In presence of—
P. E. TESCHEMACHER,
N. W. STEARNS.